ived May 21, 1963

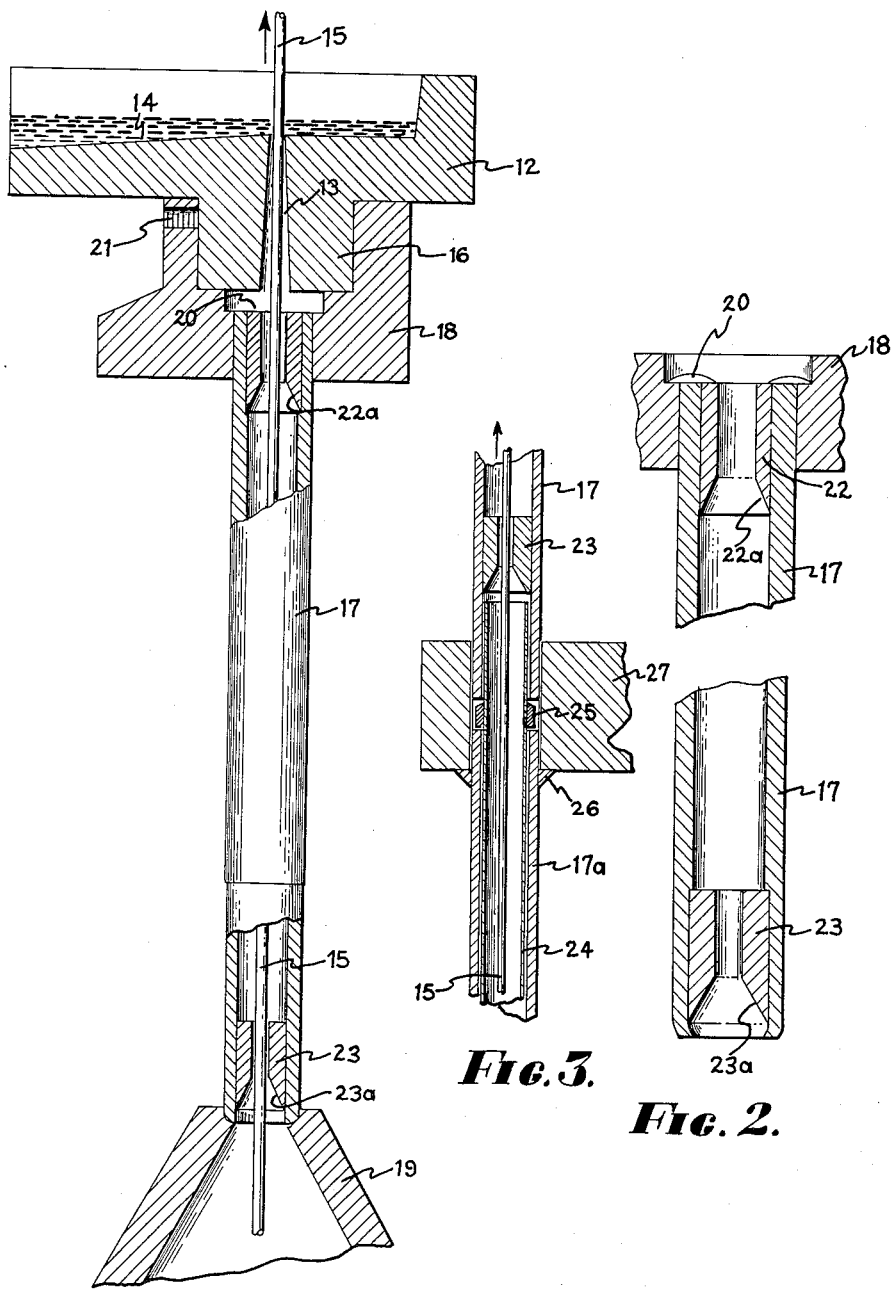

3,090,352
MOLTEN METAL TRAP FOR COATING
APPARATUS
Earle L. Knapp, Kansas City, Mo., assignor to Armco
Steel Corporation, Middletown, Ohio, a corporation of
Ohio
Filed Sept. 26, 1960, Ser. No. 58,272
7 Claims. (Cl. 118—405)

This invention relates to a trap for molten metal in metal coating apparatus. In my Patent No. 2,914,423 dated November 24, 1959, I disclosed and claimed a method and apparatus for coating metallic strands and specifically wire, wherein the strand passes vertically upward through an aperture in the bottom of a coating pot after having passed through a pretreatment such as those disclosed in the Sendzimir Patnets Nos. 2,110,893 and 2,136,957.

In accordance with the Sendzimir disclosures, the wire strand is chemically cleaned and dried and then passes through a high temperature gas reduction furnace and then through a controlled cooling furnace. Thence, according to my said patent, the wire passes through a so-called turn-up box which contains a sheave about which the wire changes direction from a horizontal path to a vertical path. The wire emerges from the turn-up box and passes through an aperture in the bottom of the coating pot and thence through a coating control element and finishing apparatus.

Occasionally some of the molten coating metal, which may be zinc or aluminum or a combination of the two, will seep through the aperture in the bottom of the coating pot and fall into the turn-up box or other pretreating apparatus which may be disposed below the coating pot. This of course is harmful to the apparatus in that the molten coating metal which seeps through falls into and upon moving parts and freezes and ultimately clogs up the machine which must then be extensively repaired.

With the foregoing considerations in mind, it is an object of the present invention to provide a trap to catch any molten coating metal seeping through the hole in the bottom of the coating pot so as to prevent its falling into the pretreatment apparatus.

It is an additional object of the invention to provide a trap as above outlined which is simple and inexpensive and which may be readily replaced or cleaned out for reuse.

Reference is made to the drawings forming a part hereof and in which:

FIGURE 1 is a cross-sectional view through a coating pot, the trap and the exit from a pretreatment apparatus.

FIGURE 2 is an enlarged cross-sectional view of the trap broken away to conserve space, and FIGURE 3 is a cross-sectional view of a modification useful in addition to the trap of FIGURES 1 and 2.

Briefly, in the practice of the invention, I provide a trap consisting of a tubular member secured in gas-tight relation to the bottom of the coating pot and extending to the pretreatment apparatus. Within this tubular member an upper insert is provided which may be made of mild steel or similar material and which has a central bore providing ample clearance about the strand. At the lower end, I provide an additional insert also having a central bore, providing a smaller amount of clearance about the strand. The lower insert also may be made of mild steel or the like.

For further trapping of possible seepage, I may provide below the lower end of the tubular member an additional tubular member having a thin walled steel tubing liner which liner is readily removable.

Referring now in more detail to the drawings, the coating pot is indicated generally at 12 and is provided with the aperture 13 in its bottom wall 14 through which the strand 15 may pass in an upwardly direction. The bottom of the pot 12 may be formed with a boss 16 to which the trap itself may be secured. The trap itself comprises a tubular member which may be common black pipe, indicated generally at 17. This pipe passes through a holder member 18 to which it may be welded as at 20. The holder member 18 is arranged to fit over the boss 16 and may be held in position thereon by one or more set screws 21. The lower end of the tubular member 17 may be seated in or connected to the upper end 19 of the turn-up box or other pretreatment apparatus.

Also secured to the tubular member 17 by the weld 20 is an upper insert 22. Within the lower end of the tubular member 17 is a similar insert 23 which may be held in place by lightly peening over the lower end of the tubular member 17.

The inserts 22 and 23 have axial bores through which the strand 15 may pass with clearance and the lower or entrance end of each insert is countersunk as at 22a and 23a to facilitate threading after a break in the wire or for any other reason.

The upper insert preferably has an internal diameter about $\frac{1}{16}$ inch greater than the diameter of the strand and the lower insert 23 has a bore whose diameter is from .035 to .040 inch larger than the diameter of the strand.

Because the inserts 22 and 23 have the clearances described above, and the adjacent sections of the coating apparatus, and hence also the inserts, are at a temperature below the melting point of the coating metal, any coating metal which seeps down into these inserts will freeze against them and will not fall further. Any molten metal which gets past the upper insert 22 will be caught by and will freeze against the lower insert 23.

While the inserts may be made from mild steel and may be case hardened to enhance their wear, other wear resistant materials may be employed and if no free carbon is embodied, conventional wire drawing carbide die inserts may be used.

In some installations and under some conditions further safeguards may be needed. In such case the embodiment illustrated in FIGURE 3 may be utilized. In this embodiment, the lower insert 23 is mounted somewhat farther up within the tubular member 17 and an additional lower tubular element 17a is provided which carries a liner tube 24. This liner tube may be made of thin walled steel tubing and is provided with a collar 25 which may be welded or otherwise suitably secured to the liner tube. The collar 25 rests upon the upper end of the member 17a with a portion of the liner tube 24 extending upward into the tubular member 17. The tubular member 17a is welded as at 26 to a bracket 27 which may be fastened in any desired manner to the frame of the coating apparatus, or demountably secured to the tubular member 17. It will be understood that in the embodiment of FIGURE 3 the lower end of the tubular member 17a communicates with the exit opening of the turn-up box or other pretreatment apparatus 19 in a manner similar to that shown in FIGURE 1.

It will be understood that gasketing means will be provided to make gas tight the several joints between the coating pot and pretreatment apparatus. Such means have not been shown in the interest of clarity.

It will be understood that many modifications may be made without departing from the spirit of the invention and I therefore do not wish to be limited in any other manner than as set forth in the claims which follow.

Having now fully described the invention, what I claim as new and desire to secure by Letters Patent is:

1. In a coating apparatus wherein a clean, hot metallic strand is coated with a different metal by the hot dip process, and wherein said strand is caused to pass from a pretreatment apparatus vertically upward through an aperture in the bottom of the coating pot containing molten coating metal; a trap for preventing molten coating metal which may seep through said aperture from getting into said pretreatment apparatus, comprising a vertical tubular member secured to the bottom of said pot in alignment with said aperture and connected to said pretreatment apparatus, said tubular member having an internal diameter substantially greater than the strand being coated, said tubular member being at a temperature below that of said coating metal, and a tubular insert in said tubular member below the top thereof, said insert having an inside diameter from about .035 inch to about .040 inch greater than said strand, said tubular insert being also at a temperature below that of said coating metal whereby any molten coating metal which falls through said aperture in the bottom of the coating pot will freeze against said insert.

2. In a coating apparatus wherein a clean, hot metallic strand is coated with a different metal by the hot dip process, and wherein said strand is caused to pass from a pretreatment apparatus vertically upward through an aperture in the bottom of the coating pot containing molten coating metal; a trap for preventing molten coating metal which may seep through said aperture from getting into said pretreatment apparatus, comprising a vertical tubular member secured to the bottom of said pot in alignment with said aperture and connected to said pretreatment apparatus, said tubular member having an internal diameter substantially greater than the strand being coated, and a tubular insert at the upper end of said tubular member, and a tubular insert at the lower end of said tubular member, said last named insert having an inside diameter less than said upper insert, but greater than said strand.

3. A structure according to claim 2, wherein the inside diameter of said last named insert is from .035 inch to .040 inch greater than said strand.

4. A structure according to claim 2, wherein the inside diameter of said last named insert is from .035 inch to .040 inch greater than said strand and wherein the inside diameter of said first named insert is at least $\frac{1}{16}$ inch greater than said strand.

5. A structure according to claim 1, wherein the connection between said tubular member and coating pot is substantially gas-tight.

6. A structure according to claim 2, wherein said tubular member below said lower insert is provided with a removable liner of thin walled steel tubing.

7. A structure according to claim 2, wherein both said inserts have the lower ends of their bores tapered to facilitate threading.

References Cited in the file of this patent

UNITED STATES PATENTS

| | | |
|---|---|---|
| 2,216,519 | Quarnstrom | Oct. 1, 1940 |
| 2,255,436 | Olson | Sept. 9, 1941 |
| 2,283,621 | Arber | May 19, 1942 |
| 2,394,545 | Grupe | Feb. 12, 1946 |
| 2,507,310 | Lodge | May 9, 1950 |

FOREIGN PATENTS

| | | |
|---|---|---|
| 755,039 | Great Britain | Aug. 15, 1956 |